Patented May 15, 1928.

1,670,015

UNITED STATES PATENT OFFICE.

LUDWIG BARTMANN, OF BERLIN, GERMANY, ASSIGNOR TO THE FIRM TREUHAND-GESELLSCHAFT M. B. H. BARTMANN & CO., OF HAGEN, WESTPHALIA, GERMANY.

METHOD OF RECOVERING THE ENDOSPERM FROM CEREALS.

No Drawing. Application filed January 20, 1926, Serial No. 82,494, and in Germany November 17, 1924.

My invention refers to the treatment of cereals, such as wheat, barley, rye, oats and the like, with a view to recovering the endosperm in pure condition without the admixture of splinters and other parts of the husk or skin surrounding the endosperm and which hitherto soiled the flour so as to discolor it.

According to the present invention the grains are not crushed in such manner as to reduce the husks and skins to smaller particles which mix with the endosperm, but the grains are first subjected to a treatment whereby the husks and skins enveloping the endosperm are rendered elastic and are imparted qualities resembling those of leather, so that the danger that splinters be separated from the husks and skins when opening them for the purpose of extracting the endosperm is entirely avoided.

While thus treating the husk or skin in order to change its physical properties, I at the same time act on the endosperm in such manner as to cause it to separate from the skins and husk and to be reduced to a soft pasty mass, without its chemical and physiological properties being changed materially. When this has been done I may act upon the grains with a steadily increasing, preferably elastic pressure, whereby the husks and skins are caused to burst and the pasty endosperm is separated therefrom by being expelled in a manner resembling the expulsion of an ointment from a tin tube, the husks and skins being recovered in empty condition and without any parts having been separated therefrom which might get admixed to the endosperm. This latter is then either used directly for the preparation of dough to be converted into bread by baking, or is dried to form flour or hard groats, which may then be ground to meal if desired.

I am aware that many attempts have been made to recover the endosperm by soaking or steeping the grains in water and other liquids, but in all former instances the soaking or steeping operation has been carried out in a manner which differs from the one adopted according to the present invention in the decisive points, both as regards duration and temperature of the operation and the condition of the product obtained. I am further aware that it has also been attempted repeatedly to recover the endosperm from cereals by crushing the grains which were previously softened by soaking or steeping, without, however, intending to or succeeding in effecting the separation between the husks and skins on the one hand and the endosperm on the other hand.

According to the present invention the soaking or steeping is continued so long until the husks and skins enveloping the endosperm have become pliable, elastic and of a leather-like consistency, while the endosperm has assumed the consistency of a soft plastic paste. The temperature of the liquid during this operation and all other conditions of working are so chosen as to prevent any injurious change of the physiological and chemical properties of the endosperm from occurring during the steeping or soaking, special means being devised for preventing putrefaction, fermentation and germination.

While putrefaction and fermentation are absolutely injurious to the endosperm, a very slight germination can even exert excellent effects on the endosperm and therefore, in speaking of the germination to be prevented in this process, it is always intended to thereby designate injurious germination.

In carrying my invention into practice, I prefer proceeding as follows: The grains of cereals to be treated are first cleaned superficially either in dry or in wet condition and are then introduced into a liquid such as water in which germination is prevented by certain substances dissolved therein.

I have ascertained that germination can be prevented by the aid of certain substances which paralyze the germs and thereby prevent germination, these substances being caused to act on the grains while they are suspended in the steeping liquid, and I prefer combining with the action of these substances the mechanical paralyzing action of permanent motion by introducing the grains in water kept permanently moving by suitable means and to which is added a small quantity of a germ-paralyzing substance, preferably a gaseous substance dissolving in water and which is separated thereafter by volatilization during the drying and baking processes without leaving any traces in the final product and without exerting any injurious effect on the endosperm and on the flour and bread produced therefrom. I have found such substance to be formaldehyde. By adding to the water used for steeping the grains so much formaldehyde in the form of its watery solution that a 0.1% solution of formaldehyde is obtained, and allowing this liquid to act on the grains during eight to twenty-four hours at a temperature varying between 15 and 40° C., I succeed in converting the husks and skins into a leather-like elastic substance and the endosperm into a soft plastic paste, while at the same time preventing any development of the micro-organisms adhering to the grains, parlyzing the germs during the soaking or steeping period and also preserving the endosperm separated from the husks and skins during the ensuing drying and storing, without in the least impairing the smell, color, taste and digestibility of the endosperm obtained.

The grains being left in the liquid during the time specified above will swell to a certain degree and on being withdrawn from the liquid are preferably subjected to a preliminary drying treatment whereby the endosperm is caused to slightly shrink so as to separate from the innermost skin inserted between it and the outer husk. After this treatment has been gone through, the grains having been freed from part of the moisture can now be subjected to squeezing pressure between two suitable pressure members the swollen grains being caused to burst under the pressure exerted upon them by the members at the point where these contact with each other. If one of the members is perforated, the pasty endosperm expelled by pressure from the bursting husks will be forced into and through these perforations and can easily be thereafter subjected to treatment to convert it into dough, or it may be dried in a continuous manner so as to be reduced to flour or to hard groats which can then be ground if desired.

By soaking or steeping the grains in flowing water I can dispense with a preliminary cleaning operation. By the preliminary drying operation inserted between the steeping and the squeezing operations I am enabled to dry the pasty endosperm expelled from the husk at a high temperature inasmuch as it contains only part of the moisture which was initially incorporated in it.

I may further act on the endosperm with substances adapted to improve the baking capacity of the endosperm, this treatment being either combined with the soaking or steeping operations or being effected at a later stage. One of these substances, which have already been used for the same purpose in the treatment of flour and which may be gases, liquids, emulsions, mixtures or the like, is ammonia. I may either introduce ammonia gas or add an ammonia solution to the steeping water, or I may act with such gas or solution on the endosperm during the preliminary drying or during the operation of expulsion or thereafter.

The formaldehyde mentioned by way of example as a means of preventing germination, putrefaction and fermentation can be replaced by a great number of other substances including sulphurous acid, hydrofluoric acid and salts of these acids, formic acid, salicylic acid, benzoic acid, peroxide of hydrogen, chloral hydrate and the like.

As explained above, either the pasty endosperm can be used directly for the preparation of dough for the baking process, or it may be dried, so as to be converted into hard groats which can be stored almost indefinitely or can be reduced to flour by grinding. The husks and skins constituting what is known as bran can be collected for further use, preferably after having been dried in a suitable manner.

Instead of paralyzing the germs during the soaking or steeping operation, I may also act on them with suitable gases or liquids for instance with formaldehyde gas at a prior stage, and I may combine this treatment with a preliminary operation of a well known kind, in which part of the husk is removed.

I wish it to be understood that I do not desire to be limited to any figures, temperatures or other physical and chemical conditions nor to the sequence of operations above described beyond those incorporated in the claims

I claim:—

1. The method of treating the grains of cereals comprising steeping the grains to soften the endosperm and at the same time treating them with a substance capable of paralyzing their germs.

2. The method of treating the grains of cereals comprising steeping the grains at a temperature not exceeding 40° C. in a liquid until the envelop surrounding the endosperm has become elastic and leatherlike and the endosperm is converted into a pasty mass, and treating the grains while immersed in such liquid, with a substance capable of paralyzing their germs.

3. The method of treating the grains of cereals comprising steeping the grains in water containing formaldehyde at a temperature not exceeding 40° C. until the envelop surrounding the endosperm has become elastic and leatherlike and the endosperm has been converted into a pasty mass.

4. The method of treating the grains of cereals comprising steeping the grains in water containing formaldehyde at a temperature not exceeding 40° C. until the envelop surrounding the endosperm has become elastic and leatherlike and the endosperm has been converted into a pasty mass, and subjecting the grains thus treated to pressure so as to cause the envelop to burst and the endosperm to be expelled.

5. The method of treating the grains of cereals comprising steeping the grains in flowing tepid water containing formaldehyde in such manner as to render the envelop surrounding the endosperm elastic and leatherlike, while converting the endosperm into a pasty mass.

6. The method of treating the grains of cereals comprising steeping the grains at a temperature not exceeding 40° C. in a watery 0.1 per cent solution of formaldehyde until the envelop surrounding the endosperm has become elastic and leatherlike and the endosperm is converted into a pasty mass.

7. The method of recovering the endosperm from cereals comprising steeping the grains of the cereal at a temperature not exceeding 40° C. in water containing formaldehyde, until the parts which surround the endosperm are rendered elastic and are imparted some of the properties of leather and the endosperm is converted into a pasty mass, subjecting the grains thus treated to a preliminary drying operation and acting on the grains thus treated with pressure so as to cause the envelop to burst and the endosperm to be expelled.

8. The method of recovering the endosperm from cereals comprising steeping the grains of the cereal at a temperature not exceeding 40° C. in water containing formaldehyde, until the parts which surround the endosperm are rendered elastic and are imparted some of the properties of leather and the endosperm is converted into a pasty mass, and incorporating in the grains thus treated a substance adapted to improve the baking capacity of the endosperm.

9. The method of recovering the endosperm from cereals comprising steeping the grains of the cereal at a temperature not exceeding 40° C. in water containing formaldehyde, until the parts which surround the endosperm are rendered elastic and are imparted some of the properties of leather and the endosperm is converted into a pasty mass, and treating the grains thus treated with ammonia.

10. The method of treating the grains of cereals comprising steeping the grains at a temperature not exceeding 40° C. in a liquid until the envelop surrounding the endosperm has become elastic and leatherlike and the endosperm is converted into a pasty mass, treating the grains, while immersed in such liquid, with a substance capable of paralyzing their germs and subjecting the grains thus treated to pressure so as to cause the envelop to burst and the endosperm to be expelled.

In testimony whereof I affix my signature.

LUDWIG BARTMANN.